United States Patent [19]

Johnson, Jr. et al.

[11] 4,365,530
[45] Dec. 28, 1982

[54] ORBIT SAW

[75] Inventors: Nolton C. Johnson, Jr.; David A. Rein, both of Bend, Oreg.

[73] Assignee: Mid Oregon Iron, Inc., Bend, Oreg.

[21] Appl. No.: 202,562

[22] Filed: Oct. 31, 1980

[51] Int. Cl.³ .................. B23D 45/04; B23D 47/12
[52] U.S. Cl. .................... 83/490; 83/477.2; 83/329; 83/508.1
[58] Field of Search ............ 83/490, 477.2, 329, 83/508.1

[56] References Cited

U.S. PATENT DOCUMENTS

| 995,082 | 6/1911 | Oliver | 83/477.2 |
|---|---|---|---|
| 1,793,544 | 2/1931 | Dekoning . | |
| 2,272,215 | 2/1942 | Lockett et al. | 83/484 X |
| 2,360,070 | 10/1944 | Meyerbach | 83/490 X |
| 3,213,734 | 10/1965 | Nystrand | 83/490 X |
| 3,292,470 | 12/1966 | Nystrand | 83/490 X |
| 3,353,430 | 11/1967 | Brackmann et al. | 83/490 X |
| 3,715,946 | 2/1973 | Kaltenbach | 83/490 X |
| 3,827,325 | 8/1974 | Ward et al. | 83/490 X |
| 3,982,456 | 9/1976 | Krylov et al. | 83/490 |
| 3,991,637 | 11/1976 | Boge | 83/490 |

Primary Examiner—Donald R. Schran
Attorney, Agent, or Firm—Kolisch, Hartwell & Dickinson

[57] ABSTRACT

Orbit saw apparatus including a driven shaft rotatably supported in an upright mounting wall which is part of the frame in the apparatus. Orbit arm structure is rotatably supported on one end of said driven shaft, and an arbor shaft parallel to the driven shaft and mounting a circular saw blade is journalled on the orbit arm structure. A motor has its output shaft connected through belts to the driven shaft, and the driven shaft is connected for drive purposes to the arbor shaft. The motor also runs a pump, which is part of a pressure fluid supply system for an adjustable hydraulic motor which produces rotation of the orbit arm structure.

9 Claims, 4 Drawing Figures

ORBIT SAW

BACKGROUND AND SUMMARY OF THE INVENTION

This invention relates to what is sometimes referred to as an orbit saw. By this phrase, it is intended to refer to saw apparatus which includes a circular saw mounted on a saw arbor, and means whereby the saw arbor moves in a circular, orbital path during a cutting pass of the saw which is mounted on the arbor.

Orbital saws have certain advantages over other types of saw apparatus. Because the saw in the apparatus after the completion of a cutting pass may be positioned below the level of a bed in the apparatus which supports the work during cutting, the saw apparatus possesses safety features not shared by saw apparatus where the saw is always exposed. Furthermore, with orbital movement of the rotating saw, relatively large pieces of material may be cut with the material being cut during the cutting operation being held stationary against a fence or guide. All moving parts in the apparatus, save for the saw itself which is exposed only during a cutting pass, may be enclosed within a protective housing.

Generally, an object of the invention is to provide an improved orbit saw apparatus which is simply constructed and reliable in operation.

The apparatus contemplated is easy to maintain. It may be constructed with full access easily provided to operating parts in the apparatus.

Another object is to provide orbit saw apparatus which permits adjustments readily to be made in the orbital speed of the saw, as might be desirable, for instance, in changing the saw from a fast cutting type of operation to a precision trimming operation.

Yet another object of the invention is to provide an orbit saw which includes a vertical mounting wall as part of the frame providing basic support for many of the operating parts in the apparatus.

Yet a further object of the invention is the provision of an orbit saw which includes means for collecting saw dust and debris produced in the cutting operation.

In a preferred embodiment of the invention an electric motor drives a driven shaft in the apparatus. The driven shaft powers saw movement through belt means connecting the driven shaft and a saw arbor journalled on orbiting structure which provides for orbital movement of the saw arbor about the driven shaft. A variable speed motor, more specifically, a hydraulic motor, is operatively coupled to the orbiting structure to produce orbital movement under power.

These and other objects and advantages are attained by the invention, which is described herein below in conjunction with the accompanying drawing, wherein.

DETAILED DESCRIPTION OF THE INVENTION

Figure 1:
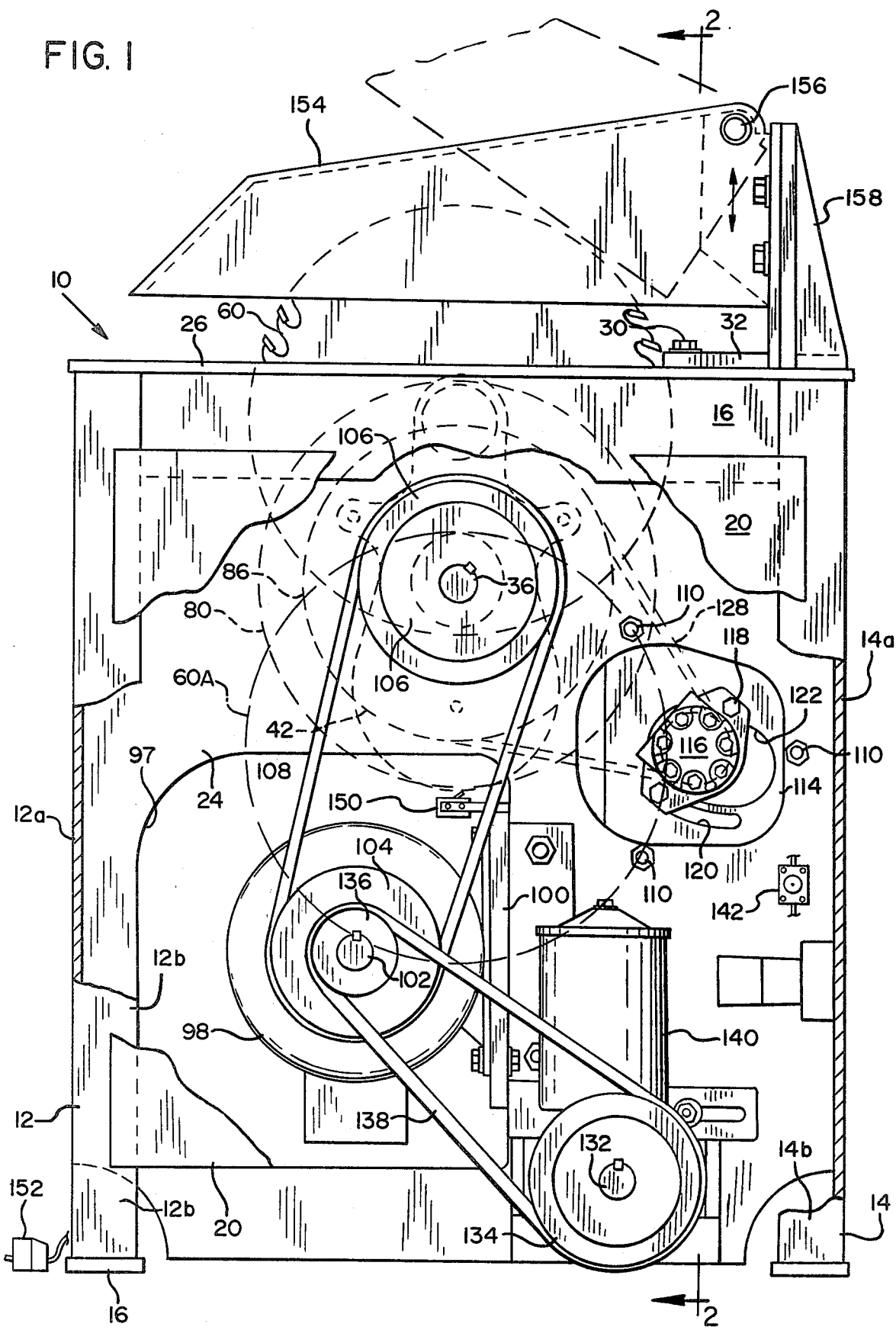
FIG. 1 is a side elevation of apparatus constructed according to the invention, with portions broken away to illustrate interior details.

Referring now to the drawings, the apparatus illustrated comprises an upstanding housing indicated generally at 10 including opposed end members 12, 14 joined together so as to form a rigid frame as by cross members 16, 18. The end members, for the most part, comprise wall expanses, as indicated at 12a, 14a, enclosing the space within the housing. At opposite margins the wall expanses are turned over to form flange portions, as indicated at 12b and 14b. Adjacent the four corners of the housing bottom extremities of these flange portions and adjacent parts of the wall expanses form legs which are bottomed by pads 16 which support the housing on the ground.

Extending between the end members, over opposite sides of the housing, are detachable housing plates, as exemplified by plates 20, 22, serving to enclose the space within the housing on opposite sides of the apparatus. Removal of these plates provides access to the interior of the housing.

Also part of the frame in the apparatus is an upstanding mounting wall 24 suitably secured along opposite end margins to the end members 12, 14. As will hereinafter be brought out, this mounting wall provides a support for the principal operating parts of the orbit saw apparatus.

The top of the housing is formed by a bed plate 26 which supports the work being cut. The bed plate, which is horizontal, includes an elongate slot 28 extending adjacent a margin of the plate, which accommodates movement of a saw blade upwardly through the bed plate on the blade partaking in orbital movement. Secured as by fasteners 30 to the bed plate, in a position extending transversally of slot 28, is a fence or guide 32 used in the positioning of the work piece prior to initiating a cutting cycle in the apparatus.

Rotatably supported on mounting wall 24 by a bearing assembly indicated generally at 34 suitably mounted on the wall is an elongate driven shaft 36. The shaft extends through the mounting wall so as to have one end portion on one side of the mounting wall and another end portion on the opposite side.

Figure 2:
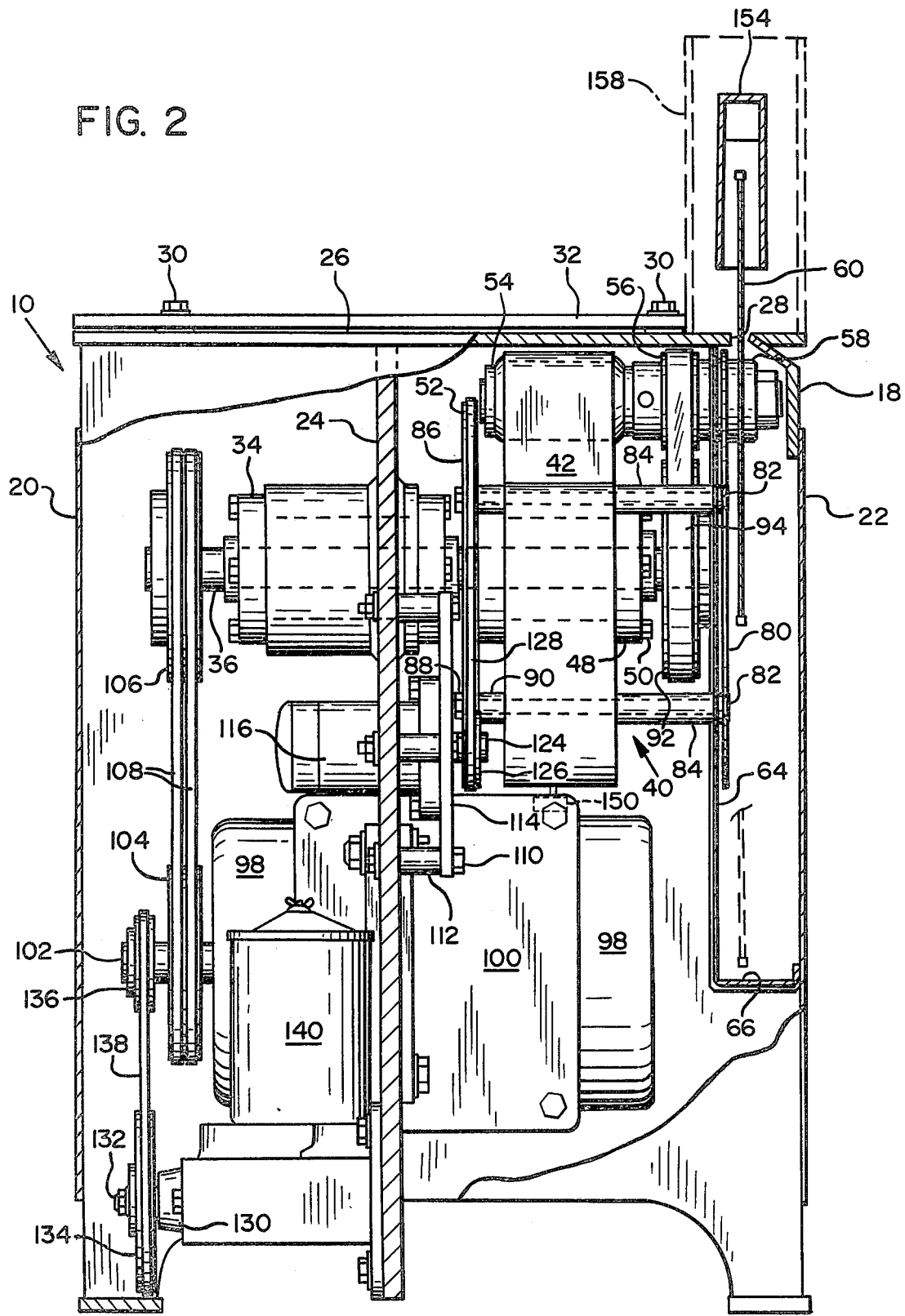
FIG. 2 is a view of the apparatus shown in FIG. 1, partly in section, taken along the line 2—2 in FIG. 1.
Figure 3:
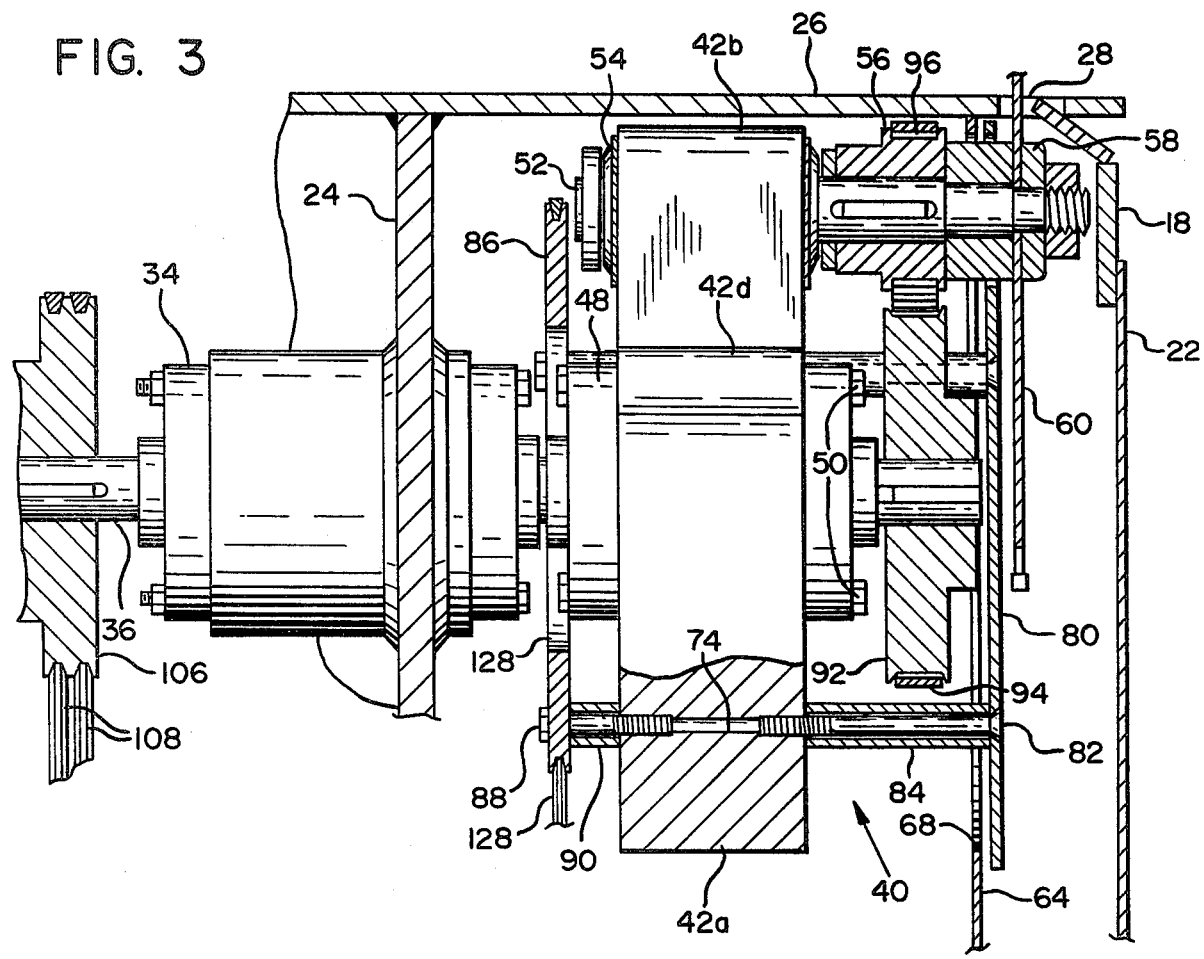
FIG. 3 is a view illustrating a driven shaft, its mounting, and orbit arm structure provided in the apparatus, drawn on a somewhat larger scale than FIG. 2, and illustrating further details.
Figure 4:
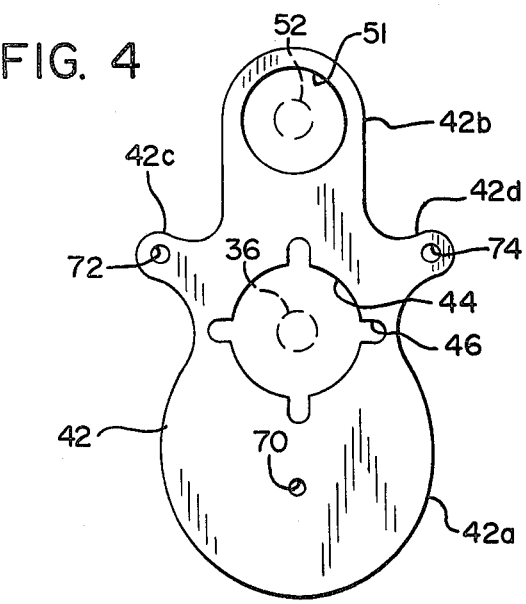
FIG. 4 illustrates a block in the orbit arm structure, removed from the apparatus and on a somewhat smaller scale than FIG. 3.

Rotatably supported on driven shaft 36, on the end portion of the shaft which is to the right of mounting wall 24 in FIG. 2, is what is referred to herein generally as orbit arm structure 40. Referring to FIGS. 3 and 4, such includes an approximately keyhole shaped block 42. Block 42 has a bore 44 extending therethrough, and communicating with this bore at points distributed about the axis thereof, elongate axially extending channels 46. The block is rotatably supported on the driven shaft, with the shaft extending through this bore, through bearing assembly 48 operatively interposed between the block and the shaft. Channels 46 described accommodate the shank portions of elongate bolts 50 present in the fastener means holding the bearing assembly together.

Block 42 includes an enlarged extension 42a, which functions as a counterweight in the orbit arm structure, and a somewhat smaller extension 42b, which is utilized in the mounting of an arbor shaft. More specifically, extending through an accommodating bore 51 prepared in extension 42b is an arbor shaft 52. Such is parallel to and laterally offset from driven shaft 36. The shaft is rotatably supported on block 42 by bearing assembly 54. The arbor shaft has an end portion projecting forwardly or beyond the extreme end or terminus of the driven shaft, as best illustrated in FIG. 3.

Mounted on the arbor shaft and keyed thereto for rotation therewith is a driven wheel member or sprocket 56. Beyond this wheel member, or forwardly thereof as the shaft is illustrated in FIG. 3, is a saw mounting assembly 58 utilized in detachably mounting a circular saw 60 on the end of the arbor shaft. With the saw so mounted, it is in a region which is located forwardly of or beyond the terminus of the driven shaft, as illustrated in FIG. 3.

As illustrated in FIG. 2, extending downwardly from bed plate 26, and substantially paralleling the plane of mounting wall 24, is a stationary casing wall 64 which is suitably fastened in place within the housing 10. The base of the wall joins with a turned over flange portion 66 which extends toward housing plate 22. Casing wall 64, as can be seen with reference to FIG. 3, is provided with a circular aperture 68. When the orbit arm structure is rotated it should be obvious that this results in orbital movement of the arbor shaft in a circular path extending about the driven shaft. Aperture 68 is of sufficient diameter to accommodate this orbital movement of the arbor shaft.

Referring again to FIG. 4, block 42 is provided with three threaded bores 70, 72, 74 extending through counterweight portion 42a, and ear projections of the block, indicated at 42c and 42d. Portions of these threaded bores located to the right side of the block as such is viewed in FIG. 3 are utilized in the mounting of a circular closure plate 80 which substantially parallels casing wall 64 and essentially closes off opening 68 earlier described. Specifically, the closure path is secured to block 42 by screws 82 screwed into threaded bores 70, 72, 74, spacers 84 serving to space the closure plate from the adjacent side of block 42.

The closure plate, together with casing wall 64 and portions of housing plate 22 define a dust collection chamber which collects saw dust and debris produced by the saw during cutting of material. If desired, a vacuum source may be provided connected to this chamber for removing the material as such collects.

Also fastened to the orbit arm structure is a driven wheel member or pulley 86. Such is secured to block 42 utilizing threaded fasteners 88 screwed into the left extremities of threaded bores 70, 72, and 74 as such are viewed in FIG. 3. Spacing the pulley from the block are spacers 90.

Driven shaft 36 is rotated at relatively high speed and is utilized to impart rotation to the arbor shaft. Specifically, keyed to the end of the driven shaft is a driving member or sprocket 92. A belt 94 is trained over sprocket 92 and sprocket 56 mounted on the arbor shaft. Preferably the belt is of a positive drive type, in that such includes transversally extending ribs along the inner expanse thereof, as designated at 96, which seat within recesses provided in the respective sprockets as the belt moves over the respective sprockets.

Referring to FIG. 1, mounting wall 24 is provided adjacent its bottom margin with an enlarged opening 97. An electric motor 98 occupies a lower portion of the interior of the housing, and occupies a position extending through opening 97 described. Suitable bracket structure 100 secures the housing of the motor to the mounting wall. The motor has an output shaft 102 which is coupled to the driven shaft by power transmitting means located to the left of the mounting wall in FIG. 2, specifically by pulleys 104 on the output shaft, pulleys 106 on the driven shaft, and belts 108 trained over these pulleys on the respective shafts.

During a cutting pass or cycle, the orbit arm structure is swung from its normal at rest position (where the arbor shaft is located below the driven shaft and the saw occupies a lowered position, as indicated by the outline of the saw at 60A in FIG. 1) to revolve the orbit arm structure essentially one revolution whereby the position of the saw moves in an orbit upwardly and generally across the bed of the device and then downwardly to return to its retracted position. Such movement is produced by an adjustable motor, more specifically, a hydraulic motor which has its output shaft coupled to pulley 86.

Specifically, and referring to FIG. 2, suitably supported on the mounting wall by fasteners 110 and spacers 112 is a bracket wall 114. The housing of a hydraulic motor 116 is adjustably mounted on this bracket wall, through fasteners 118 and arcuate openings 120, 122, which permit adjustment in the position of the hydraulic motor for belt tensioning purposes. The output shaft 124 of the hydraulic motor has mounted thereon a driving member or pulley 126 which is connected by belt 128 to pulley 86 earlier described.

A source of pressure fluid is provided for the hydraulic motor, and such includes a pump driven by electric motor 98. Specifically, suitably supported on mounting wall 24 is a hydraulic pump 130. The pump is powered by rotating an input shaft 132 mounting a pulley 134. Output shaft 102 of motor 98 mounts a pulley 136. Pulleys 134, 136 are connected by belt 138 whereby rotation of the electric motor's output shaft drives the pump.

Also a part of the hydraulic system for the motor is a reservoir or tank 140 supported on the mounting wall. An adjustable valve 142 controls the flow of hydraulic fluid to the hydraulic motor whereby the speed of the motor may be controlled or adjusted. To produce a fast orbital speed the supply of hydraulic fluid is increased, such as fast orbital speed being useful, for instance, in a fast cutting operation. For precision trimming and where a lower speed is desired, the supply of hydraulic fluid to the hydraulic motor is reduced.

Conduits interconnecting the hydraulic motor, valve, and reservoir, and associated structure, have been eliminated from the drawings for simplicity reasons, such hydraulic circuitry being conventional.

Shown at 150 is the housing of a proximity switch. The proximity switch is included as part of a control system which stops the hydraulic motor upon the orbit arm structure completing a cutting cycle by completing one rotation about the axis of the driven shaft. On depressing of a foot switch, such as foot switch 152, the hydraulic motor starts with delivery of pressure fluid to the motor. On completing one revolution, the proximity switch is actuated which in turn actuates a suitable solenoid valve or the like cutting off the supply of hydraulic fluid to the motor. In this way, the rotating saw when it is not undertaking a cutting cycle is maintained within the confines of housing 10, which is a safety feature.

The saw apparatus may further be provided with an adjustable blade guard 154 pivotally supported at 156 on stand 158 secured to the housing 10. The guard has a hollow interior which accommodates the movement therethrough of upper portions of the saw blade during the time that the saw is making a cutting pass through material supported on bed plate 26.

The operation of the apparatus should be obvious from the above. Material to be cut is placed on the bed plate against fence 32. After being properly positioned, foot switch 152 is depressed, starting the hydraulic motor whereby the orbit arm structure undergoes one rotation. During this rotation the saw blade moves from a position below the bed plate and within the housing in an orbital path, which is upwardly and then across the bed plate with upper portions of the saw blade exposed above the bed plate. During such movement, any material resting on the bed plate is cut by the saw. On returning to a position within the housing the proximity switch stops the hydraulic motor.

With the exception of the saw blade (and then only during the making of a cutting pass), major operating parts of the saw apparatus are enclosed within housing 10. Operating parts are fully exposed by removal of detachable housing plates 20, 22. Major operating parts are all supported on the upstanding wall 24 which extends vertically within the housing.

Debris produced during the cutting operation collects within the chamber described.

While a specific embodiment of the invention has been described obviously variations and modifications are possible.

It is claimed and desired to secure by Letters Patent:

1. An orbit saw comprising:
a frame including an upstanding mounting plate,
a driven shaft extending through and rotatably supported in said mounting plate with ends on either side of said plate,
orbit arm structure concentric with the driven shaft and rotatably mounted on one protruding end of the driven shaft on one side of said plate,
an arbor shaft laterally offset from the driven shaft and journalled on said orbit arm structure,
a driven wheel member on said one side of the plate concentric with the driven shaft and secured to the orbit arm structure,
a first motor of variable speed and an output shaft driven by said first motor located on said one side of the plate and positioned laterally of said driven shaft and belt means connecting said output shaft and said driven wheel member,
a second motor with an output shaft and power-transmitting means on the other side of said plate connecting the second motor's output shaft and said driven shaft, and
power-transmitting means connecting said driven shaft and said arbor shaft.

2. The orbit saw of claim 1, wherein said variable speed motor is a hydraulic motor adjustably mounted on said plate, and which further includes a source of pressure fluid for said hydraulic motor including a pump driven by said second motor.

3. The orbit saw of claim 1, wherein said arbor shaft includes an end protruding beyond said one end of said driven shaft with means for mounting a circular saw on said protruding end at a region disposed forwardly of said one end of said driven shaft, and which further includes a dust shield secured to said orbit arm structure located rearwardly of the region located by such a saw, and housing structure defining, in conjunction with said dust shield, a dust chamber for collecting debris.

4. An orbit saw comprising:
a frame,
a driven shaft rotatably supported on the frame including one end portion and an opposite end portion,
orbit arm structure concentric with and encircling said one end portion of said driven shaft and relatively rotatably mounted with respect to said one end portion,
an arbor shaft journalled on said orbit arm structure parallel to but laterally offset from the driven shaft and having an end portion protruding forwardly of the terminus of said one end portion of the driven shaft, said arbor shaft partaking of orbital movement with rotation of the orbit arm structure,
a saw mounted on said end portion of said arbor shaft spaced forwardly of the terminus of said one end portion of the driven shaft,
a stationary wall mounted on said frame extending normal to said driven shaft and located rearwardly of said saw and including an aperture through which said arbor shaft extends through, said aperture having a size accommodating orbital movement of the arbor shaft, and
an aperture closure plate normal to said driven shaft secured to said orbit arm structure in a position substantially closing off said aperture.

5. The orbit saw of claim 4, wherein said aperture is circular, said closure plate is circular, and said wall is located substantially at the terminus of said end portion of said driven shaft.

6. The orbit saw of claims 4 or 5, which further includes housing structure defining in conjunction with said wall and said closure plate a dust collection chamber.

7. The orbit saw of claim 6, wherein said frame includes an upstanding mounting wall, said one end portion of said driven shaft is located on one side of said mounting wall and said opposite end portion is located on the opposite side of said mounting wall, and the driven shaft is rotatably supported by bearing means rotatably supporting said driven shaft on said mounting wall.

8. The orbit saw of claim 7, which further includes a first motor having an output shaft mounted on said mounting wall located on said one side of said wall, belt means connecting the output shaft of said first motor and said orbit arm structure wherein said first motor rotates the orbit arm structure, a second motor including an output shaft disposed on the opposite side of said mounting wall, and power-transmitting means connecting the output shaft of said second motor and said driven shaft whereby said second motor produces powered rotation of said driven shaft.

9. The orbit saw of claim 8, wherein said first motor is a variable speed motor.

* * * * *